US009718908B2

(12) United States Patent
Pannell

(10) Patent No.: US 9,718,908 B2
(45) Date of Patent: Aug. 1, 2017

(54) POLYMER PRODUCTS AND MULTI-STAGE POLYMERIZATION PROCESSES FOR THE PRODUCTION THEREOF

(71) Applicant: Univation Technologies, LLC, Houston, TX (US)

(72) Inventor: Richard B. Pannell, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/775,837

(22) PCT Filed: Feb. 21, 2014

(86) PCT No.: PCT/US2014/017667
§ 371 (c)(1),
(2) Date: Sep. 14, 2015

(87) PCT Pub. No.: WO2014/143526
PCT Pub. Date: Sep. 18, 2014

(65) Prior Publication Data
US 2016/0009839 A1    Jan. 14, 2016

Related U.S. Application Data

(60) Provisional application No. 61/790,730, filed on Mar. 15, 2013.

(51) Int. Cl.
| | | |
|---|---|---|
| C08F 210/16 | (2006.01) |
| C08F 2/14 | (2006.01) |
| C08F 2/34 | (2006.01) |
| C08F 4/64 | (2006.01) |
| C08F 2/38 | (2006.01) |

(52) U.S. Cl.
CPC ................................. *C08F 210/16* (2013.01)

(58) Field of Classification Search
CPC .... C08F 2/001; C08F 2/14; C08F 2/34; C08F 210/16; C08F 2500/05
USPC .......................................................... 526/65
See application file for complete search history.

(56) References Cited

U.S. PATENT DOCUMENTS

| | | | |
|---|---|---|---|
| 6,369,129 | B1 | 4/2002 | Maartensson |
| 8,097,678 | B2 * | 1/2012 | Van Marion .......... C08F 297/08 525/191 |
| 2011/0240333 | A1 * | 10/2011 | Junqvist .................. C08L 23/04 174/110 SR |
| 2012/0141702 | A1 | 6/2012 | Shim et al. |

FOREIGN PATENT DOCUMENTS

WO        03-066699 A1    8/2003

OTHER PUBLICATIONS

International Search Report and Written Opinion for related PCT Application PCT/US2014/017667, mailed May 15, 2014 (11 pgs).

* cited by examiner

*Primary Examiner* — Fred M Teskin
(74) *Attorney, Agent, or Firm* — Brooks, Cameron & Huebsch, PLLC

(57) ABSTRACT

Multi-stage polymerization processes that produce polymers having controlled compositions and molecular weight with improved catalyst productivity are disclosed. An example method for producing a multi-modal polyolefin comprises polymerizing the multi-modal polyolefin in the presence of a metallocene catalyst system in at least a slurry-phase polymerization stage and a gas-phase polymerization stage arranged in series in any order, wherein the multi-modal olefin comprises: (i) a first polyolefin fraction having a density of less than about 940 kg/m$^3$, and (ii) a second polyolefin fraction having a density of less than about 930 kg/m$^3$.

16 Claims, 5 Drawing Sheets

POLYMER PRODUCTS AND MULTI-STAGE POLYMERIZATION PROCESSES FOR THE PRODUCTION THEREOF

This application is a National Stage Application under 35 U.S.C. §371 of International Application Number PCT/US2014/017667, filed Feb. 21, 2014 and published as WO 2014/143526 on Sept. 18, 2014 which claims the benefit to U.S. Provisional Application 61/790,730, filed Mar. 15, 2013, the entire contents of which are incorporated herein by reference in its entirety.

FIELD

The invention generally relates to processes for the polymerization of olefins. More particularly, embodiments disclosed herein relate to multi-stage polymerization processes that produce polymers having controlled compositions and molecular weight with improved catalyst productivity.

BACKGROUND

Advances in polymerization and catalysts have produced new polymers having improved physical and mechanical properties useful in a wide variety of products and applications. With the development of new catalysts, the choice of polymerization, such as solution, slurry, high pressure, or gas phase, for producing a particular polymer has been greatly expanded. Advances in polymerization technology have also provided more efficient, highly productive and economically enhanced processes.

Multimodal polymers are known to be useful for making a variety of commercial products such as films, pipe, and blow molding products. In general, a multimodal polymer has at least two (e.g., two, three or more) molecular weight fractions, and a molecular weight distribution that determines a different identifiable molecular weight for each molecular weight fraction. For example, a multimodal polymer may have at least one low molecular weight fraction and at least one high molecular weight fraction, and a molecular weight distribution that determines an identifiable (relatively high) molecular weight for the high molecular weight fraction and another identifiable (relatively low) molecular weight for the low molecular weight fraction. A composition comprising only two molecular weight fractions is referred to as "bimodal."

A number of different techniques have been developed to produce multimodal polymers. One such technique uses a suitable polymerization catalyst to broaden the molecular weight distribution in the resultant polymer. Multi-stage polymerization processes have also been used in which different hydrogen concentrations may be used in the different stages to broaden the molecular weight distribution of the resultant polymer. Examples of multi-stage polymerization processes include slurry-phase-slurry-phase processes, gas-phase-gas-phase processes, and slurry-phase-slurry-phase processes. One particular process for producing a bimodal polymer utilizes a loop reactor and a gas-phase reactor arranged in series. Despite their use in commercial products, multimodal polymers still desire improvements in their production processes as current processes may lack adequate molecular weight control. Improved control of molecular weight control may beneficial for producing polyolefins suitable for a number of different applications, including blown and cast film applications.

SUMMARY

Disclosed herein is an example method for producing a multi-modal polyolefin that comprises polymerizing the multi-modal polyolefin in the presence of a metallocene catalyst system in at least a slurry-phase polymerization stage and a gas-phase polymerization stage arranged in series in any order, wherein the multi-modal olefin comprises: (i) a first polyolefin fraction having a density of less than about 940 kg/m$^3$, and (ii) a second polyolefin fraction having a density of less than about 930 kg/m$^3$.

Also disclosed herein is a polymer product produced by a polymerization process that comprises polymerizing the multi-modal polyolefin in the presence of a metallocene catalyst system in at least a slurry-phase polymerization stage and a gas-phase polymerization stage arranged in series in any order, wherein the multi-modal olefin comprises: (i) a first polyolefin fraction having a density of less than about 940 kg/m$^3$, and (ii) a second polyolefin fraction having a density of less than about 930 kg/m$^3$.

Also disclosed herein is a polyolefin film produced by a polymerization process that comprises polymerizing the multi-modal polyolefin in the presence of a metallocene catalyst system in at least a slurry-phase polymerization stage and a gas-phase polymerization stage arranged in series in any order, wherein the multi-modal olefin comprises: (i) a first polyolefin fraction having a density of less than about 940 kg/m$^3$, and (ii) a second polyolefin fraction having a density of less than about 930 kg/m$^3$.

BRIEF DESCRIPTION OF THE DRAWINGS

These drawings illustrate certain aspects of the present invention and do not limit or define the invention.

DETAILED DESCRIPTION

Figure 1:
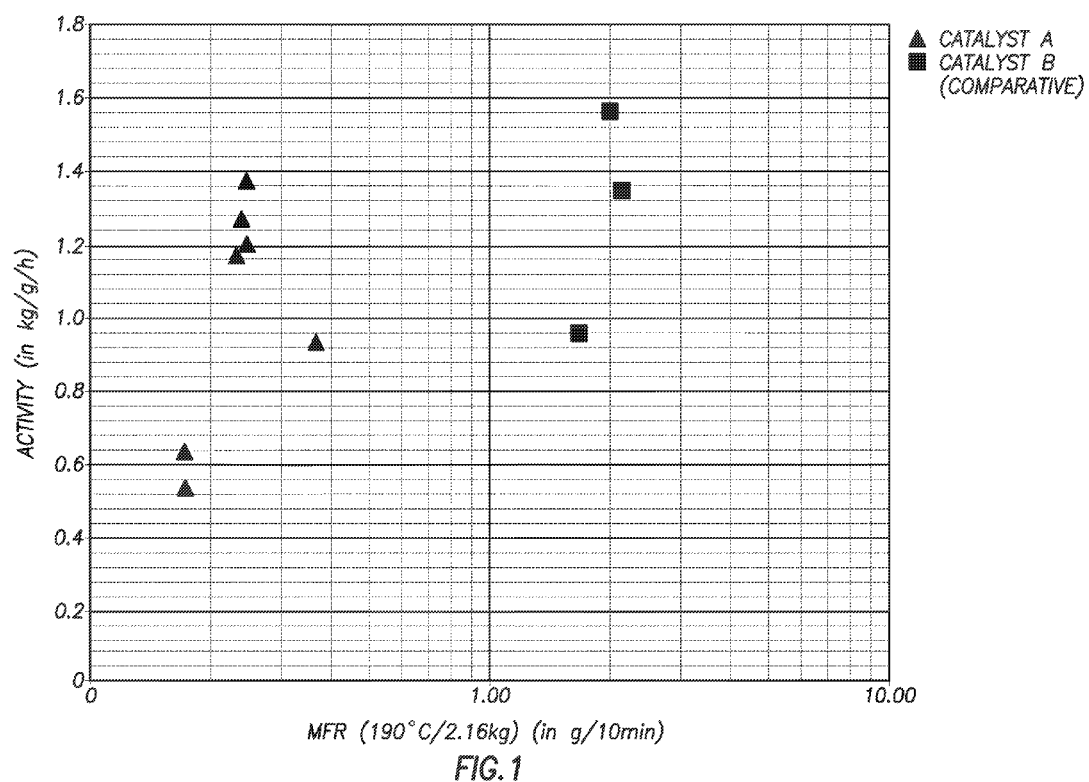
FIG. 1 is a graphical representation showing melt flow rate versus activity for various polyolefins produced in an example slurry-phase reactor.

The invention generally relates to processes for the polymerization of olefins. More particularly, embodiments disclosed herein relate to multi-stage polymerization processes that produce polymers having controlled compositions and molecular weight with improved catalyst productivity.

Embodiments of the present invention are directed to processes for the polymerization of olefins in a reaction sequence that comprises a slurry-phase reactor and a gas-phase reactor arranged in series. In accordance with present embodiments, the polymerization takes place in the presence of a metallocene catalyst. By controlling the polymerization conditions in the slurry-phase and gas-phase reactors, a polyolefin having two different molecular weight fractions (also referred to as a multimodal polymer) may be produced. For example, the concentration of monomers and hydrogen in the slurry-phase reactor and the reactant partial pressures in the gas-phase reactor may be controlled to produce a multimodal polyolefin with controlled molecular weight and composition. Advantageously, the multimodal polyolefin produced in accordance with present embodiments may have improved flowability, for example, by production of a lower molecular weight polyolefin in the slurry-phase reactor. Improved flowability may be beneficial in the production of films due to the resultant high throughput and stable behavior on the film line. Improved catalyst productivity may also be obtained by controlling the polymerization conditions in the slurry-phase and gas-phase reactors.

It must be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Metallocene Catalysts

The catalyst system used in the polymerization process described herein may comprise a metallocene catalyst. Suitable metallocene catalysts may be represented by Formula (I):

$$Cp^A Cp^B MX_n \qquad (I)$$

wherein M is a transition metal; each X is chemically bonded to M; each Cp group is chemically bonded to M; and n is 0 or an integer from 1 to 4. In some embodiments, n is either 1 or 2. M, X, and Cp are described in further detail below.

The metal atom "M" of the metallocene catalyst may be selected from Groups 3 through 12 atoms and lanthanide Group atoms; or may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be Ti, Zr, or Hf atoms; or may be Hf; or may be Zr. The oxidation state of the metal atom "M" can range from 0 to +7; or may be +1, +2, +3, +4, or +5; or may be +2, +3 or +4. The Cp ligand(s) form at least one chemical bond with the metal atom M. The Cp ligands are distinct from the leaving groups, X, bound to metal atom M in that they are not highly susceptible to substitution/abstraction reactions.

$Cp^A$ and $Cp^B$ are, independently, one or more rings or ring systems, at least a portion of which includes π-bonded systems, such as cycloalkadienyl ligands and heterocyclic analogues. The rings or ring systems typically comprise atoms selected from Groups 13 to 16 atoms, and, in some embodiments, the atoms that make up the $Cp^A$ and $Cp^B$ ligands are selected from carbon, nitrogen, oxygen, silicon, sulfur, phosphorous, germanium, boron, aluminum, and combinations thereof, where carbon makes up at least 50% of the ring members. In some embodiments, the $Cp^A$ and $Cp^B$ ligands are selected from substituted and unsubstituted cyclopentadienyl ligands and ligands isolobal to cyclopentadienyl. Non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof $Cp^A$ and $Cp^B$ may be the same or different, either or both of which may contain heteroatoms and either or both of which may be substituted by any combination of one or more substitution groups, R. Non-limiting examples of substituent groups R include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof More particular non-limiting examples of alkyl substituents R associated include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins, such as, but not limited to, olefinically unsaturated substituents including vinyl-terminated ligands, for example 3-butenyl, 2-propenyl, 5-hexenyl, and the like. In some embodiments, at least two R groups, for example two adjacent R groups, are joined to form a ring structure having from 3 to 30 atoms selected from carbon, nitrogen, oxygen, phosphorous, silicon, germanium, aluminum, boron and combinations thereof. Also, a substituent R group, such as 1-butanyl, may form a bonding association to the element M.

Each X is a leaving group bonded to the transition metal atom. For purposes herein, the term "leaving group" refers to one or more chemical moieties, such as a ligand, bound to M, that can be abstracted from the catalyst component by an activator or cocatalyst, thus producing a catalyst species active for olefin polymerization or oligomerization. Each X is independently selected from, for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. X may be a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. X may be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls; or X may be selected from hydride, chloride, fluoride, methyl, phenyl, phenoxy, benzoxy, tosyl, fluoromethyls, and fluorophenyls; or X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X may be selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls).

Suitable metallocene catalysts may also be represented by Formula (II):

$$Cp^A(A)Cp^B MX_n \qquad (II)$$

These compounds are known as "bridged metallocenes." $Cp^A$, $Cp^B$, M, X and n in Formula (II) are as defined above for Formula (I). Furthermore, each Cp ligand is chemically bonded to M, and (A) is chemically bonded to each Cp.

Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for Formula (I) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si (R'$_2$)—, R'$_2$Ge=, R'P=(wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Formula (II) has two or more bridging groups (A).

Other non-limiting examples of bridging group (A) in Formula (II) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

Bridging group (A) in Formula (II) may also be cyclic, comprising, 4 to 10 ring members or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination thereof The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, Cl) or R, as defined above.

It is also contemplated that, the metallocene catalysts may include their structural or optical or enantiomeric isomers (meso and racemic isomers) and mixtures thereof. In some embodiments, the metallocene compounds may be chiral and/or a bridged metallocene catalyst compound. Further, as used herein, a single, bridged, asymmetrically substituted metallocene catalyst component having a racemic and/or meso isomer does not, itself, constitute at least two different bridged, metallocene catalyst components.

Suitable metallocene catalyst compounds and catalyst systems may be described in, for example, U.S. Pat. Nos.

4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664. Also, the disclosures of European publications such as EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144 may describe useful metallocene catalysts and associated catalyst systems.

Activators for Metallocene Catalysts

Catalyst systems used in embodiments of the disclosed multi-stage polymerization processes may further comprise an activator. As used herein, the term "activator" refers to any compound or component, or combination of compounds and components, capable of enhancing the ability of a metallodcene catalyst to oligomerize or polymerize unsaturated monomers, such as olefins. It should be understood that the metallocene catalyst may be activated for oligomerization and/or polymerization catalysis in any manner sufficient to allow coordination or cationic oligomerization and or polymerization.

Aluminoxanes activators may be utilized as an activator. Aluminoxanes may include linear, cyclic, caged, or polymeric structures. Aluminoxanes include, for example, oligomeric compounds containing —Al(R)—O— subunits, where R is an alkyl group. In some embodiments, R may be a $C_1$ to $C_8$ alkyl group. The aluminoxanes may contain linear, cyclic, caged, and/or cross-linked species. Examples of aluminoxanes include methylaluminoxane ("MAO"), modified methylaluminoxane ("MMAO"), ethylalumoxane, and isobutylalumoxane. In some embodiments, alkylaluminoxanes and modified alkylaluminoxanes are suitable as catalyst activators, particularly when the abstractable ligand is a halide. Mixtures of different aluminoxanes and modified aluminoxanes may also be used. Aluminoxanes are further described in, for example, U.S. Pat. Nos. 4,665,208, 4,952, 540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1, and WO 94/10180.

In some embodiments, a visually clear methylalumoxane may be used. A cloudy or gelled aluminoxane can be filtered to produce a clear solution or clear aluminoxane can be decanted from the cloudy solution. Another aluminoxane is MMAO cocatalyst type 3A (commercially available from Akzo Chemicals, Inc. under the trade name Modified Methylalumoxane type 3A, disclosed in U.S. Pat. No. 5,041,584).

An ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or a combination thereof, may also be used. It is also within the scope of this disclosure to use neutral or ionic activators alone or in combination with aluminoxane or modified aluminoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In embodiments, the three substituent groups may be independently selected from the group of halogen, moNo. or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, in an embodiment fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241, 025, 5,384,299 and 5,502,124 and U.S. patent application Ser. No. 08/285,380, filed Aug. 3, 1994.

Examples of suitable activators include those described in WO 98/07515, such as tris(2,2',2"-nonafluorobiphenyl) fluoroaluminate. Combinations of activators are also contemplated, for example, aluminoxanes and ionizing activators in combination as described in EP-B1 0 573 120, WO 94/07928, WO 95/14044 and U.S. Pat. Nos. 5,153,157 and 5,453,410. WO 98/09996 describes activating metallocene catalyst compounds with perchlorates, periodates, and iodates, including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organoboron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see e.g., EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859, 653 and 5,869,723 and PCT WO 98/32775.

Methods for Supporting

The above described metallocene catalysts may be combined with one or more supports using one of the support methods well known in the art or as described below. In one particular embodiment, a metallocene catalyst is used in a supported form. For example, the metallocene catalyst may be used in a supported form wherein the metallocene catalyst is deposited on, contacted with, or incorporated within, adsorbed or absorbed in, or on a support or carrier.

As used herein, the term "support" and "carrier" are used interchangeably and refer to any porous or non-porous support material, including porous support materials such as talc, inorganic oxides and inorganic chlorides. Other carriers include resinous support materials such as polystyrene divinyl benzene polyolefins or polymeric compounds, or any other organic or inorganic support material and the like, or mixtures thereof Examples of suitable supports are inorganic oxides that include those Group 2, 3, 4, 5, 13 or 14 metal oxides. Specific examples of suitable supports include silica, alumina, silica-alumina, magnesium chloride, and mixtures thereof. Other useful supports include magnesia, titania, zirconia, montmorillonite (EP-B1 0 511 665) and the like. Also, combinations of these support materials may be used, for example, silica-chromium, silica-alumina, silica-titania and the like.

In some embodiments, the support, such as an inorganic oxide, has a surface area in the range of from about 10 to about 700 $m^2/g$, pore volume in the range of from about 0.1 to about 4.0 cc/g and average particle size in the range of from about 5 to about 500 μm. In additional embodiments, the surface area of the support is in the range of from about 50 to about 500 $m^2/g$, pore volume of from about 0.5 to about 3.5 cc/g and average particle size of from about 10 to about 200 μm. In yet additional embodiments, the surface area of the support is from about 100 to about 400 $m^2/g$, pore volume from about 0.8 to about 3.0 cc/g and average particle size is from about 5 to about 100 μm. The average pore size of the support may be in the range of from 10 to 1000 Å, 50 to about 500 Å, or 75 to about 350 Å.

Examples of supported metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 5,770,664, 6,090,740, and WO 95/32995, WO 95/14044, WO 96/06187 and WO 97/02297.

In one embodiment, the metallocene catalyst may be deposited on the same or separate supports together with an activator, or the activator may be used in an unsupported form, or may be deposited on a support different from the supported metallocene catalyst, or any combination thereof There are various other methods in the art for supporting a polymerization catalyst compound or catalyst system of the invention. For example, the metallocene catalyst may contain a polymer bound ligand as described in U.S. Pat. Nos. 5,473,202 and 5,770,755, the metallocene catalyst may be spray dried as described in U.S. Pat. No. 5,648,310, the support used with the metallocene catalyst may be functionalized as described in EP-A-0 802 203, or at least one substituent or leaving group is selected as described in U.S. Pat. No. 5,688,880.

In some embodiments, a supported metallocene catalyst system may be used that includes an antistatic agent or surface modifier that is used in the preparation of the supported catalyst system as described in WO 96/11960. The catalyst systems may be prepared in the presence of an olefin, for example hexene-1.

In some embodiments, a method for producing the supported metallocene catalyst system is described in WO 96/00245 and WO 96/00243. In this method, the metallocene catalyst is slurried in a liquid to form a metallocene solution and a separate solution is formed containing an activator and a liquid. The liquid may be any compatible solvent or other liquid capable of forming a solution or the like with the cyclic bridged metallocene catalyst compounds and/or activator of the invention. In one particular embodiment, the liquid is a cyclic aliphatic or aromatic hydrocarbon, such as toluene. The metallocene catalyst and activator solutions are mixed together and added to a porous support or the porous support is added to the solutions such that the total volume of the metallocene catalyst solution and the activator solution or the metallocene catalyst and activator solution is less than four times the pore volume of the porous support, more preferably less than three times, even more preferably less than two times; preferred ranges being from 1.1 times to 3.5 times range and most preferably in the 1.2 to 3 times range. Another preferred method is to pre-react the porous support with an activator in a hydrocarbon diluent. The hydrocarbon solution of the metallocene catalyst is added later to complete the catalyst preparation.

Procedures for measuring the total pore volume of a porous support are well known in the art. Details of one of these procedures are discussed in Volume 1, Experimental Methods in Catalytic Research (Academic Press, 1968) (specifically see pages 67-96). This preferred procedure involves the use of a classical BET apparatus for nitrogen absorption. Another method well known in the art is described in Innes, Total Porosity and Particle Density of Fluid Catalysts By Liquid Titration, Vol. 28, No. 3, Analytical Chemistry 332-334 (March, 1956).

The mole ratio of the metal of the activator component to the metal of the supported cyclic bridged metallocene catalyst compounds may be in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the cyclic bridged metallocene catalyst may be in the range of between 0.3:1 to 3:1. Where an unsupported cyclic bridged metallocene catalyst is utilized, the mole ratio of the metal of the activator component to the metal of the cyclic bridged metallocene catalyst may be in the range of between 0.3:1 to 10,000:1, 100:1 to 5000:1, or 500:1 to 2000:1.

In one particular embodiment, the catalyst system comprises a metallocene catalyst as described herein activated by methylaluminoxane (MAO) and supported by silica. While conventionally, MAO is combined with a metallocene catalyst and then the combination is deposited on silica, in some embodiments, the activator (e.g. MAO) and the support (e.g. silica) may be first combined and then combined with the metallocene catalyst. Modified MAO (MMAO) or a combination of MAO and MMAO may also be used. In one embodiment, the catalyst compound comprises $Me_2Si(H_4Ind)ZrCl_2$, where Me is methyl and $H_4Ind$ is tetrahydroindenyl.

In another particular embodiment, the catalyst system comprises a metallocene catalyst as described herein activated by methylaluminoxane (MAO) and supported by silica. While conventionally, MAO is combined with a metallocene catalyst and then the combination is deposited on silica, in some embodiments, the activator (e.g. MAO) and the support (e.g. silica) may be first combined and then combined with the metallocene catalyst. Modified MAO (MMAO) or a combination of MAO and MMAO may also be used. In one embodiment, the catalyst compound comprises $(C_5H_3Me\ n\text{-}Bu)_2ZrCl_2$, where Me is methyl n-Bu is n-butyl.

In one embodiment the metallocene catalyst is used in an unsupported form, preferably in a liquid form such as described in U.S. Pat. Nos. 5,317,036 and 5,693,727, and EP-A-0 593 083. The metallocene catalyst in liquid form can be fed to a reactor as described in WO 97/46599.

In one embodiment, the metallocene catalyst may be combined with a carboxylic acid salt of a metal ester, for example aluminum carboxylates such as aluminum mono, di- and tri-stearates, aluminum octoates, oleates and cyclohexylbutyrates, as described in U.S. Pat. Nos. 6,300,436 and 7,354,880.

Multi-Stage Polymerization Process

Embodiments for producing polyolefins disclosed herein may utilize a multi-stage polymerization process. The polymerization process may be carried out, for example, in a series of polymerization stages selected from the group of slurry-phase and gas-phase polymerization stages. In some embodiments, the polymerization process may comprise a slurry-phase reactor and a gas-phase reactor arranged in series. Embodiments of the process may comprise more than one slurry-phase reactor and more than one gas-phase reactor, for example, up to 10 slurry-phase reactors and 5 gas-phase reactors may be used. Example multi-stage polymerization processes are described in more detail in U.S. Pat. Nos. 6,552,150 and 7,576,166 and U.S. Patent Publication No. 2011/028827.

The processes described herein are suitable for the production of homopolymers of olefins, including ethylene and/or propylene, and/or copolymers, terpolymers, and the like, of olefins, including polymers comprising ethylene and/or propylene and at least one or more other olefins (also referred to as a co-monomer). In an embodiment, the olefin is a monomer selected from the group consisting of ethylene, propylene, and any combination thereof. In some embodiments, the ethylene content of the polyethylene prepared by the processes disclosed herein may be at least about 50% by weight of the total monomers involved. The term "polyethylene" when used herein is used generically to refer to any or all of the polymers comprising ethylene.

One or more co-monomers may be employed at any stage of the polymerization process. The co-monomers may be alpha-olefins. The co-monomers, for example, may contain from 2 to 16 carbon atoms in one embodiment. In other embodiments, ethylene and a co-monomer comprising from 3 to 12 carbon atoms, or from 4 to 10 carbon atoms, or from 4 to 8 carbon atoms, may be used. Specific examples of co-monomers that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. The content of the co-monomer (e.g., the alpha-olefin) incorporated into the copolymer may be no greater than 30 mole percent ("mol %") in total, or may be from 3 to 20 mol %.

Hydrogen may also be used at any stage of the polymerization process. Hydrogen is often used in olefin polymerization to control the final properties of the polyolefin. Increasing the concentration (partial pressure) of hydrogen may increase the melt flow rate (MFR) and/or melt index (MI) of the polyolefin generated. The MFR or MI can thus be influenced by the hydrogen concentration. The amount of hydrogen in the polymerization may be expressed as a mole ratio relative to the total polymerizable monomer, for example, ethylene, or a blend of ethylene and hexene or propylene. In an embodiment, the amount of hydrogen used in the polymerization processes is an amount sufficient to achieve the desired MFR or MI of the final polyolefin resin. Melt flow rate for polypropylene may be measured according to ASTM D 1238 (230° C. with 2.16 kg weight); melt index ($I_2$) for polyethylene may be measured according to ASTM D 1238 (190° C. with 2.16 kg weight).

As previously mentioned, the multi-stage reaction may comprise two or more polymerization stages arranged in series. By way of example, a first slurry-phase reaction stage may be carried out in one or more slurry-phase reactors, and a second gas-phase reaction stage may be carried out in one or more gas-phase reactors. In the first reaction stage, an olefin, optionally hydrogen, and/or an optional co-monomer may be subjected to a first polymerization reaction to produce a first polyolefin fraction. A reactor effluent comprising the first polymerization fraction may be recovered from the slurry-phase reaction stage and fed to the gas-phase reaction stage with additional olefin, optional hydrogen, and optional co-monomer also being fed to the gas-phase stage. The additional olefin, optional hydrogen, and optional co-monomer may then be subjected to a second polymerization reaction in the presence of the first polymerization fraction to produce a second polyolefin fraction. A reactor effluent comprising the first and second polymerization fractions may be recovered from the gas-phase polymerization stage.

The slurry-phase polymerization stage may include any known reactor suitable for use in slurry-phase polymerization. This type of reactor, and means for operating the reactor are well known. Examples of suitable reactors include continuous stirred tank reactors and loop reactors. In loop reactors, the slurry may be circulated with a high velocity along a closed pipe by using a circulation pump. More than one slurry-phase reactor may be used in series. For example, the polymer suspension produced in the polymerization reaction in an inert hydrocarbon may be fed without separation of inert components and monomers to the following slurry-phase reactor, either periodically or continuously. The following slurry-phase reactor may act at a lower temperature and pressure than the previous slurry-phase reactor.

In some embodiments, a slurry comprising an olefin and a diluent, such as a hydrocarbon diluent, may be fed to the slurry-phase reaction stage. Optionally, the slurry may further comprise the hydrogen and co-monomer. Examples of suitable hydrocarbon diluents include $C_3$ to $C_8$ hydrocarbons such as propane, propylene, n-butane, isobutane, hexanes such as n-hexane and isohexanes, heptanes, octanes, and mixtures thereof. In some embodiments, the diluent may be a low boiling point hydrocarbon having form 1 to 4 carbon atoms or a mixture of such hydrocarbons. In particular embodiments, the diluent may comprise propane with minor amounts of methane, ethane, and/or butane.

The concentration of the olefin, hydrogen, and/or co-monomer in the slurry may be adjusted to control properties of the polymer product, such as the molecular weight and composition. Higher concentrations of hydrogen produce homopolymers or copolymers of lower molecular weight and therefore higher MFR or MI. For co-polymerization, the density of the polymer product is related to the concentration of co-monomer with the polymer density decreasing with increasing co-monomer concentration. The olefin may be present in the slurry in an amount from about 2 mol % to about 50 mol %, about 3 mol % to about 20 mol %, or about 3 mol % to about 10 mol %. For producing propylene homopolymer, the polymerization may be run in liquid propylene with hydrogen for molecular weight control. Higher olefin content may increase catalyst productivity, but can require more ethylene recycle than if a lower concentration was used. Where used, the mole ratio of co-monomer to olefin is in the range of about 0.01 to 1.0, or about 0.05 to 0.6 and is determined by the density of polymer to be made and the incorporation efficiency of the catalyst. Where used, the hydrogen may be present in the slurry in ratio to ethylene expressed in molar parts per million of hydrogen to olefin in mole percent in the range of about 1.0 to 25 or from about 1.5 to 15 or from about 2 to 10. For the slurry reactor, control of the polymer density may be primarily controlled by the ratio of co-monomer to monomer and the MI by the ratio of hydrogen to monomer. Embodiments may use higher reactor temperatures to achieve higher MI and higher density at the same concentrations of monomer, co-monomer and hydrogen. Control of reactor temperature and monomer, co-monomer and hydrogen may be used to produce the desired copolymer properties.

In one embodiment, the one or more reactors in the slurry-phase polymerization stage may have a temperature ranging from about 50° C. to about 115° C., from about 60° C. to about 110° C., or from about 70° C. to about 100° C. In one embodiment, the one or more reactors in the slurry-phase polymerization stage may have a pressure ranging from 1 bar to 150 bar or from 1 bar to 100 bar or from about 5 bar to 70 bar.

A reactor effluent comprising the first polyolefin fraction produced in the slurry-phase polymerization stage may be withdrawn and transferred to a gas-phase polymerization stage, which may comprise one or more gas-phase polymerization reactors. The first polyolefin fraction may be withdrawn from the slurry-phase polymerization stage, either intermittently or continuously. In some embodiments, the pressure of the first polymerization product and the slurry including the diluent and optional hydrogen may be reduced after the slurry-phase polymerization stage to evaporate volatile components such as the residual hydrogen and diluent from the reactor effluent. The residual hydrogen and diluent may be recycled for reuse in the slurry-phase polymerization stage.

In general, the gas-phase polymerization stage may be a continuous gas-phase process, such as a fluid-bed process. In an embodiment, a fluid-bed reactor may have a reaction zone and a velocity reduction zone (i.e., disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some or all of the recirculated gases may be cooled and compressed to form liquids in the circulating gas that increase the heat removal capacity of the circulating gas stream when readmitted to the reaction zone. A suitable rate of gas flow may be readily determined by simple experiment. Makeup of gaseous monomer may be added to the circulating gas stream at a rate equal to the rate at which particulate polymer product and monomer associated therewith is withdrawn from the reactor, and the composition of the gas passing through the reactor is adjusted to maintain an essentially steady state gaseous composition within the reaction zone. The second polyolefin fraction produced in the gas-phase reactor and the first polyolefin fraction may be withdrawn from the reaction zone, either intermittently or continuously. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

Useful gas phase polymerization processes include those that utilize a fluidized bed reactor. This type reactor, and means for operating the reactor, are well known and are described in, for example, U.S. Pat. Nos. 3,709,853; 4,003,712; 4,011,382; 4,302,566; 4,543,399; 4,882,400; 5,352,749; 5,541,270; EP-A-0 802 202. These patents disclose gas phase polymerization processes wherein the polymerization medium is either mechanically agitated or fluidized by the continuous flow of the gaseous monomer and diluent.

In one embodiment, the one or more reactors in the gas phase or fluidized bed polymerization stage may have a pressure ranging from about 0.7 to about 70 bar or from about 5 bar to about 50 bar or from about 10 bar to 30 bar. In one embodiment, the one or more reactors may have a temperature ranging from about 10° C. to about 150° C., or from about 50° C. to about 115° C. In an embodiment, the reactor temperature may be operated at the highest feasible temperature taking into account the sintering temperature of the polymer within the reactor. In embodiments, the superficial gas velocity in the one or more reactors may range from about 0.2 to about 1.1 meters/second (about 0.7 to about 3.5 feet/second), or from about 0.3 to about 0.9 meters/second (about 1.0 to about 2.7 feet/second) or from about 0.5 to 0.8 meters/second (about 1.6 to about 2.6 feet/second). In embodiments, stirred or fluidized bed gas phase polymerization systems may be used.

The concentration of the olefin, hydrogen, and/or co-monomer in the gas-phase in the gas-phase reactor may be adjusted to control properties of the polymer product, such as the molecular weight by adjusting the hydrogen to olefin ratio and composition by adjusting the co-monomer to olefin ratio. By maintaining the olefin concentration and ratios of co-monomer to olefin and hydrogen to olefin constant as well as maintaining a constant reactor temperature are required to produce a polymer or copolymer with consistent and uniform properties. The olefin may be present in the gas phase in an amount from about 5 mole % to about 80 mole %, about 10 mole % to about 70 mole % by mole, or about 30% mole % to about 70 mole %. Where used, the co-monomer may be present in the gas phase in an amount in mole ratio to the olefin from about 0.005 to about 0.25 or from about 0.03 to about 0.08 mole co-monomer to mole olefin. Where used, the hydrogen may be present in the gas phase in an amount in ratio to the olefin in molar parts per million to olefin mole percent (ppm/mol %) of from about 1.0 to about 16.0 or from about 1.5 to about 10.0.

The partial pressures of the olefin, hydrogen, and/or co-monomer in the gas-phase in the gas-phase reactor may be adjusted to control properties of the polymer product, such as the molecular weight and composition. Olefin partial pressure in a gas phase reactor are generally in the range of from about 5 bar to about 50 bar or from about 6 bar to about 25 bar or from about 8 to about 20 bar. Where used, the co-monomer may be present in the gas phase in an amount in mole ratio to the olefin from about 0.005 to about 0.40 or from about 0.01 to about 0.25 mole co-monomer to mole olefin. Where used, the hydrogen may be present in the gas phase in an amount in ratio to the olefin in molar parts per million to olefin mole percent (ppm/mol %) of from about 1.0 to about 30.0 or from about 1.5 to about 20.0. In embodiments, one or more olefins, including ethylene or propylene or combinations thereof, may be prepolymerized in the presence of a metallocene catalyst system prior to the main polymerization. The prepolymerization may be carried out batch-wise or continuously in gas, solution or slurry phase, including at elevated pressures. The prepolymerization may take place with any olefin monomer or combination and/or in the presence of any molecular weight controlling agent such as hydrogen. Co-monomers may also be used in the prepolymerization. For examples of prepolymerization procedures, see U.S. Pat. Nos. 4,748,221; 4,789,359; 4,923,833; 4,921,825; 5,283,278; and 5,705,578 and European publication EP-B-0279 863 and WO 97/44371. In embodiments, the metallocene catalyst system may all be fed into the prepolymerization stage. However, portions of the metallocenes catalyst system and cocatalyst, if any, may also be fed into the other polymerization stages, as desired for a particular application.

Processes disclosed herein may optionally use inert particulate materials as fluidization aids in the gas phase polymerization reactor. These inert particulate materials can include carbon black, silica, talc, and clays, as well as inert polymeric materials. Carbon black, for example, has a primary particle size of about 10 nanometers to about 100 nanometers, an average size of aggregate of about 0.1 microns to about 30 microns, and a specific surface area from about 30 $m^2/g$ to about 1500 $m^2/g$. Silica has a primary particle size of about 5 nanometers to about 50 nanometers, an average size of aggregate of about 0.1 microns to about 30 microns, and a specific surface area from about 50 $m^2/g$ to about 500 $m^2/g$. Clay, talc, and polymeric materials have an average particle size of about 0.01 microns to about 10 microns and a specific surface area of about 3 $m^2/g$ to 30 $m^2/g$. These inert particulate materials may be used in amounts ranging from about 0.3% to about 80%, or from about 5% to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the multi-stage polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are described in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the catalyst, or as part of the catalyst In embodiments, the reactors disclosed herein are capable of producing greater than 500 lbs of polymer per hour (227 kg/hr) to about 300,000 lbs/hr (136,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 175,000 lbs/hr (79,450 kg/hr).

Polymerization Products

Embodiments of the multi-stage polymerization processes may be used to produce a polyolefin. As previously described, the polymer products may be homopolymers of olefins, including ethylene and/or propylene, and/or copolymers, terpolymers, and the like, of olefins, including polymers comprising ethylene and/or propylene and at least one or more other olefins (also referred to as a co-monomer). By controlling the reaction conditions, a multi-modal polyolefin may be produced. Accordingly, the polyolefins produced in the multi-stage polymerization processes may comprise a first polyolefin fraction and a second polyolefin fraction.

The first polyolefin fraction produced in the slurry-phase polymerization stage may have, for example, a density of less than about 940 $kg/m^3$ or less than about 930 $kg/m^3$. In some embodiments, the first polyolefin fraction may have a density ranging from about 920 $kg/m^3$ to about 940 $kg/m^3$ or from about 925 $kg/m^3$ to about 935 $kg/m^3$. The first polyolefin fraction produced in the slurry-phase polymerization stage may have, for example, a melt index (MI) or (I2) as measured by ASTM-D-1238-E (190° C./2.16 kg) of 1 dg/min or greater or of 5 dg/min or greater.

The second polyolefin fraction produced in the gas-phase polymerization stage may have, for example, a density of less than about 930 $kg/m^3$ or less than about 925 $kg/m^3$. In some embodiments, the second polyolefin fraction may have a density ranging from about 905 $kg/m^3$ to about 930 $kg/m^3$ or from about 915 $kg/m^3$ to about 925 $kg/m^3$. The second polyolefin fraction produced in the gas-phase polymerization may have, for example, a melt index of 3 dg/min or less or of 1 dg/min or less.

The polyolefins produced in the multi-stage polymerization process may contain, for example, from about 20% to about 50% of the first polyolefin fraction and from about 80% to about 50% of the second polyolefin fraction. In other embodiments, the polyolefins may contain, for example, from about 35% to about 45% of the first polyolefin fraction and from about 65% to about 55% of the second polyolefin fraction or from about 37% to about 43% of the first polyolefin fraction and from about 63% to about 57% of the second polyolefin fraction.

The polyolefins produced in the multi-stage polymerization process may have a density, for example, ranging from about 915 $kg/m^3$ to about 925 $kg/m^3$. In some embodiments, the polyolefins may have a density, for example, ranging from about 918 $kg/m^3$ to about 922 $kg/m^3$. Melt Index Ratio (MIR, $I_{21}/I_2$) of the resultant polyolefins may be controlled in the range of from about 17 to about 25 or from about 17 to about 22 or from about 18 to about 21

The polyolefins produced by the multi-stage polymerization process may have a molecular weight distribution, a weight average molecular weight to number average molecular weight (Mw/Mn), for example, of greater than 1.5 to about 15. In other embodiments, the polymers may have an Mw/Mn of greater than 2 to about 10 or greater than 2.2 to less than about 4.

The polyolefins produced by the multi-stage polymerization process may have a melt index (MI) or (I2), for example, in the range from 0.01 dg/min to 10 dg/min. In other embodiments, the polymers may have a melt index of from about 0.1 dg/min to about 5 dg/min or from about 0.5 dg/min to about 3 dg/min. For example, the polymer may have a melt index of about 3 dg/min or less or of about 1 dg/min or less.

The polymers of the invention in an embodiment may have a melt index ratio ($I_{21}/I_2$) (I21 is measured by ASTM-D-1238-F, [190° C./21.6 kg]), for example, of from 15 to 30. In other embodiments, the polymers may have an melt index ratio of from 17 to less than 25, from 18 to 22.

The polymers produced by embodiments of the process of the invention can be used in a wide variety of products and end-use applications. The polymers produced by the process of the invention may include, but are not limited to, linear low density polyethylene.

In some embodiments, the polymer produced by embodiments of the present invention may be used to produce a polymer product characterized by a low gel count. By way of example, the polymer products comprising the polyolefins may have a gel count of about 300 gels per square meter or less in one embodiment. The gel count of the polymer products may be determined using an OCS gel counter as will be apparent to those of ordinary skill in the art.

Polymers produced by the process of the invention and blends thereof are useful in such forming operations as film, pipe, sheet, fiber extrusion and co-extrusion. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners.

EXAMPLES

The following examples are put forth so as to provide those skilled in the art with a complete disclosure and description of how to make and use the methods and systems of the invention, and are not intended to limit the scope of that which the inventors regard as their invention.

In all the Examples, Catalysts A and B were used. Catalyst A is XCAT™ HP-100 catalyst, available from Univation Technologies, Houston, Tex. XCAT™ HP-100 catalyst is a single-site metallocene catalyst. Catalyst B is single site transition metal coordination catalyst. Catalyst B is a comparative catalyst that was used in evaluation of the performance of Catalyst A in the following Examples.

Example 1

Ethylene was polymerized in a bench-scale slurry-phase reactor using either Catalyst A or Catalyst B (comparative). A series of runs was conducted using either Catalyst A or Catalyst B. For each run, the slurry comprised ethylene and a co-monomer in a propane diluent (1350 ml). The co-monomer included in the slurry was 1-hexene (37 ml). The ethylene concentration in the loop reactor was 12 mol %. The reactor was operated at 80° C. and 38 bar pressure. The polymerizations were each conducted for 60 minutes. In contrast to Catalyst B, Catalyst A was observed to have process stability in that there was no activity decay during the 60 minute polymerization.

FIG. 1 is a graph showing MFR (190° C./2.16 kg) of the resultant polymer versus activity of the catalyst for the different runs of Catalyst A and Catalyst B. MFR is measured for the polyethylene according to ASTM D 1238 (190° C./2.16 kg). Activity is measured in kilograms of polyethylene per gram of polymerization catalyst-hour. From FIG. 1, it can be seen that the metallocene catalyst (Catalyst A) had a better molecular weight capacity.

Example 2

Figure 2:
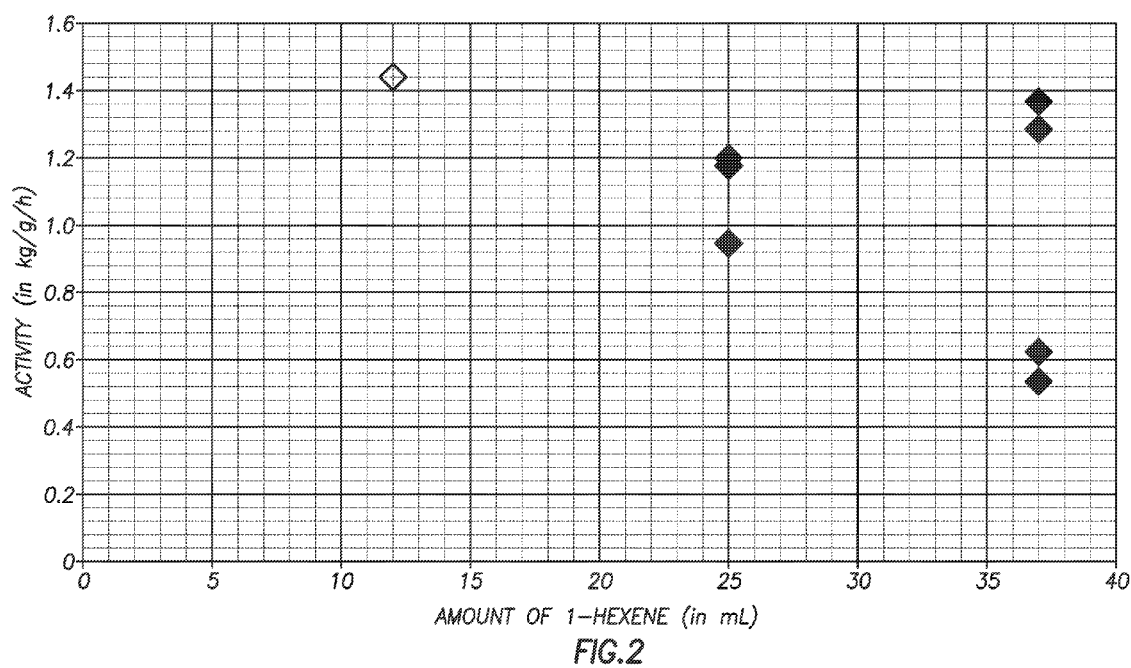
FIG. 2 is a graphical representation showing concentration of 1-hexene versus activity for various polyolefins produced in an example slurry-phase reactor.

Additional series of ethylene polymerization runs were conducted in the bench-scale slurry-phase reactor using Catalyst A. For each run, the slurry comprised ethylene and a co-monomer in a propane diluent (1350 ml). The co-monomer included in the slurry was 1-hexene in amounts of 12 to 37 ml. The ethylene concentration in the loop reactor was 12 mol %. The reactor was operated at 80° C. 38 bar pressure. Hydrogen was added to the reactor for a partial pressure of 0.5 bar (12 ml 1-hexene addition). The concentration of the co-monomer was adjusted to provide a polymer with an MFR (190° C./2.16 kg) of 210 g/10 min. The polymerizations were each conducted for 60 minutes. The resultant polymer had a low bulk density (140 g/cm$^3$). FIG. 2 is a graph showing concentration of 1-hexene versus activity of the catalyst for the different runs of Catalyst A.

Example 3

Ethylene was polymerized in a pilot-scale multi-stage polymerization process using either Catalyst A or Catalyst B. A loop reactor was operated at 85° C. and 65 bar pressure. Into the loop reactor, ethylene, a co-monomer (1-butene), a propane diluent, and a polymerization catalyst were added so that a target of 35 kg/hr of polyethylene was produced. Hydrogen was added to the loop reactor for certain runs with Catalyst A to produce a polymer with an MFR (190° C./2.16 kg) in the range of 0.8 to 1.2 but not with Catalyst B. Trisiobutylaluminum was added at a rate of 0.5 g/hr. The concentration of ethylene in the loop reactor was from 4-5 mol %. The mole ratio of the 1-butene co-monomer to ethylene in the loop reactor was 50 mol/kmol. The residence time in the loop reactor was 60 minutes. The polymer containing the polymerization catalyst was separated from the reaction media and transferred to a gas-phase reactor where additional ethylene, 1-hexene co-monomer, and hydrogen (for Catalyst A runs) were added so that a target of 35 kg/hr of polyethylene was produced. The gas-phase reactor was operated at 80° C. and 20 bar pressure with an ethylene concentration of 30 mol %. The mole ratio of the 1-hexene co-monomer to ethylene in the gas-phase reactor was 50 mol/kmol. Trisiobutylaluminum was added at a rate of 2 g/hr. The residence time in the gas-phase reactor was 3 hours. The target production rate for the overall process was 70 kg/hr. The target MFR (190° C./2.16 kg) of the resultant polymer was 1 g/10 min. The target density of the resultant polymer was 918 g/cm$^3$.

The polyethylene sample produced using Catalyst A in the multi-stage polymerization process with an MFR (190° C./2.16 kg) of 1.2 g/10 min had a density of 917.2 g/cm$^3$, a Mn of 37 kiloDaltons, a Mw of 97 kiloDaltons, and a Mw/Mn of 2.6.

Figure 3:
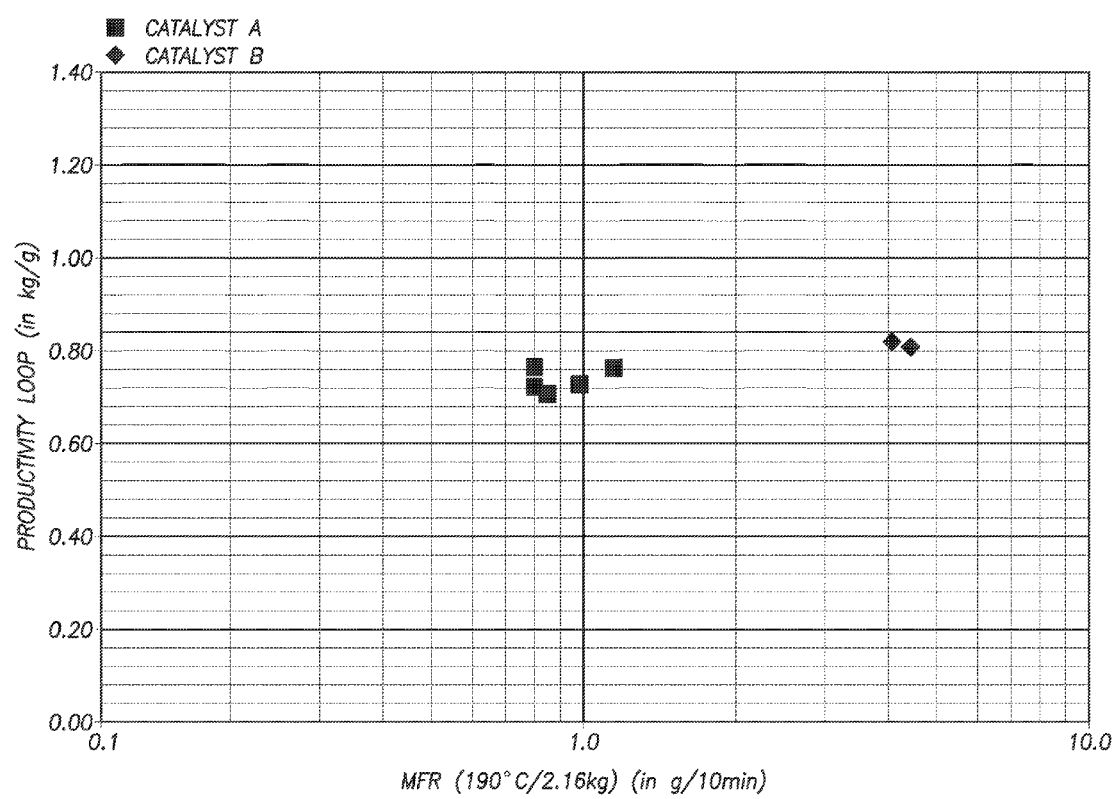
FIG. 3 is a graphical representation showing melt flow rate versus productivity for various polyolefins produced in a slurry-phase reactor in an example multi-stage polymerization process.
Figure 4:
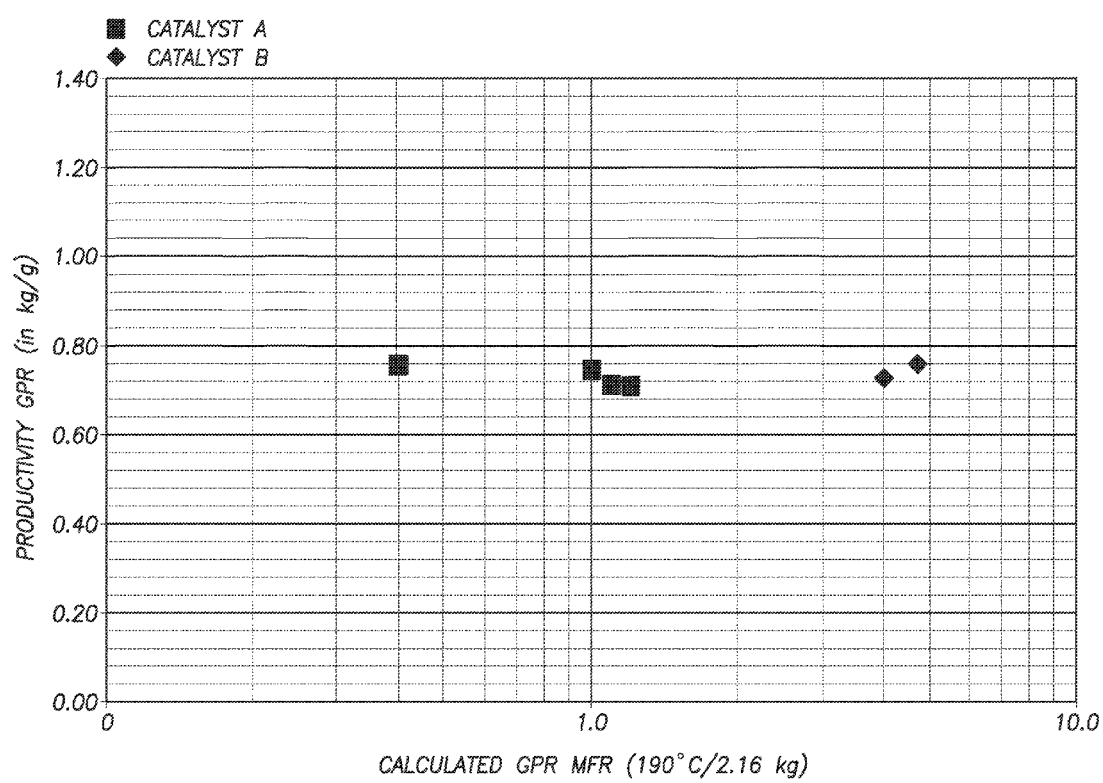
FIG. 4 is a graphical representation showing melt flow rate versus productivity for various polyolefins produced in a gas-phase reactor in an example multi-stage polymerization process.

FIG. 3 is a graph showing MFR (190° C./2.16 kg) of the resultant polymer versus catalyst productivity for the different runs of Catalyst A and Catalyst B in the loop reactor. As previously mentioned, no hydrogen was used for the runs with Catalyst B. Catalyst productivity is measured in kilograms of polyethylene per gram of polymerization catalyst. The catalyst productivity in the loop reactor was approximately 0.8 kg/g for each run. FIG. 4 is a graph showing MFR of the resultant polymer versus catalyst productivity for the different runs of Catalyst A and Catalyst B in the gas-phase reactor. No hydrogen was used for the runs with Catalyst B or the run for Catalyst A with MFR of approximately 0.3 g/10 min. Catalyst productivity is measured in kilograms of polyethylene per gram of polymerization catalyst. The catalyst productivity in the gas-phase reactor was approximately 0.8 kg/g for each run. The overall productivity for the multi-stage process was approximately 1.6 kg/g.

Figure 5:
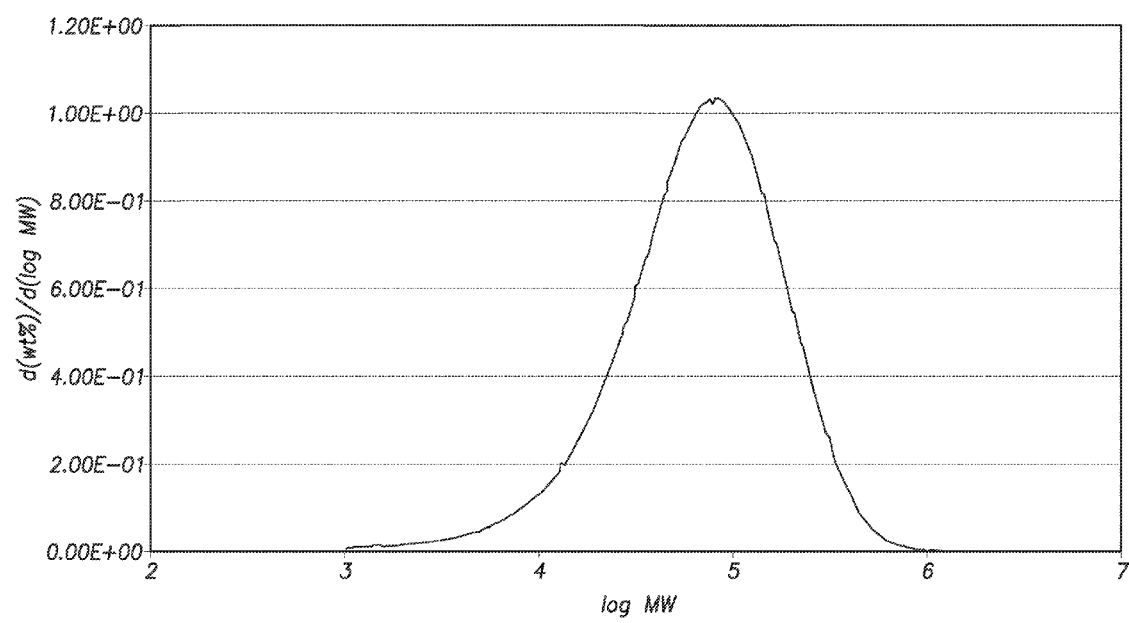
FIG. 5 is a graphical representation showing base ten logarithm of molecular weight versus d(wt %)/d(log molecular weight) for a polyolefin product from an example multi-stage polymerization process.

FIG. 5 is a graph showing the base ten logarithm (log) of molecular weight (MW) versus d(wt %)/d(log MW), wherein d(wt %) is the derivative (d) of weight percent and d(log MW) is the derivative (d) of the base ten logarithm (log) of molecular weight (MW) for the 1.2 MFR product from the series reactors. Weight percent as a function of molecular weight molecular weight are determined by gel permeation chromatograph.

Example 4

Example 3 was repeated with the ethylene concentration in the slurry reactor in the 5 mol % to 8 mol % range and the 1-butene-to-ethylene ratio of about 0.062 mol/Kmol, and the ethylene concentration in the gas phase reactor increased from 30 mol % ethylene to 60 to 65 mol %. The catalyst productivity increased from 1.6 kg/g to about 4 kg/g.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

All documents and references cited herein, including testing procedures, publications, patents, journal articles, etc. are herein fully incorporated by reference for all jurisdictions in which such incorporation is permitted and to the extent such disclosure is consistent with the description of the present invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Although individual embodiments are discussed, the invention covers all combinations of all those embodiments.

What is claimed is:

1. A process for producing a multi-modal polyolefin, comprising:
polymerizing the multi-modal polyolefin in the presence of a metallocene catalyst system in at least a slurry-phase polymerization stage and a gas-phase polymerization stage arranged in series in any order, wherein the multi-modal polyolefin has a molecular weight distribution (Mw/Mn) of greater than 2 to about 10 and comprises: (i) a first polyolefin fraction having a density of less than about 940 kg/m$^3$, and (ii) a second polyolefin fraction having a density of less than about 930 kg/m$^3$ and wherein the metallocene catalyst system comprises $(C_5H_3Me,n-Bu)_2ZrCl_2$, where Me is methyl Bu is n-butyl.

2. The process of claim 1 wherein the first polyolefin fraction has a density of less than about 930 kg/m$^3$.

3. The process according to claim 1 wherein the second polyolefin fraction has a density of less than about 925 kg/m$^3$.

4. The process according to claim 1 wherein the first polyolefin fraction has a melt index of 1 dg/min or greater, and wherein the second polyolefin fraction as a melt index of 3 dg/min or less.

5. The process according to claim 1 wherein the first polyolefin fraction has a melt index of 5 dg/min or greater.

6. The process according to claim 1 wherein the second polyolefin fraction as a melt index of 1 dg/min or less.

7. The process according to claim 1 wherein first polyolefin fraction is present from about 30% to about 50% by weight of the multi-modal polyolefin, and wherein the second polyolefin fraction is present from about 70% to about 50% by weight of the multi-modal polyolefin.

8. The process according to claim 1 wherein ethylene is present in the slurry-phase polymerization stage in an amount ranging from about 3 mol % to about 10 mol %, and wherein a co-monomer is present in the slurry-phase polymerization stage in an amount ranging from about 0.05 to about 0.6 mole of the co-monomer per mole of the ethylene.

9. The process according to claim 1 wherein the gas-phase polymerization stage has an ethylene partial pressure of about 6 bar to about 25 bar and wherein a co-monomer is present in the gas-phase polymerization stage in an amount ranging from about 0.03 to about 0.08 mole of the co-monomer per mole of the ethylene in the gas phase.

10. The process according to claim 1 wherein the multi-modal polyolefin comprises polyethylene.

11. The process according to claim 1 wherein at least ethylene and a co-monomer are polymerized to produce the multi-modal polyolefin.

12. The process according to claim 11 wherein the co-monomer used in the slurry reactor is 1-butene and the co-monomer used in the gas phase reactor is 1-hexene.

13. The process according to claim 11 wherein the co-monomer comprises from 3 to 12 carbon atoms.

14. The process according to claim 1 wherein the slurry-phase polymerization stage precedes the gas-phase polymerization stage.

15. The process according to claim 1 wherein the slurry-phase polymerization stage comprises a loop reactor.

16. The process according to claim 1 wherein hydrogen gas is introduced into slurry-phase polymerization stage and into the gas-phase polymerization stage.

* * * * *